US012456443B2

(12) United States Patent
Johnson

(10) Patent No.: US 12,456,443 B2
(45) Date of Patent: Oct. 28, 2025

(54) MUSICAL INSTRUMENT SUPPORT APPARATUS

(71) Applicant: Auxilium Instrument Supports LLC, Beaverton, OR (US)

(72) Inventor: Travis Christopher Johnson, Beaverton, OR (US)

(73) Assignee: AUXILIUM INSTRUMENT SUPPORTS LLC, Beaverton, OR (US)

( * ) Notice: Subject to any disclaimer, the term of this patent is extended or adjusted under 35 U.S.C. 154(b) by 415 days.

(21) Appl. No.: 17/987,540

(22) Filed: Nov. 15, 2022

(65) Prior Publication Data

US 2023/0154444 A1 May 18, 2023

Related U.S. Application Data

(60) Provisional application No. 63/389,224, filed on Jul. 14, 2022, provisional application No. 63/280,816, filed on Nov. 18, 2021.

(51) Int. Cl.
*G10G 5/00* (2006.01)

(52) U.S. Cl.
CPC .................................... *G10G 5/005* (2013.01)

(58) Field of Classification Search
CPC ............ G10G 5/005; G10G 5/00; G10D 1/08; G10D 1/00
See application file for complete search history.

(56) References Cited

U.S. PATENT DOCUMENTS 11,610,567 B1 * 3/2023 Maalouf .................. G10G 5/00

* cited by examiner

*Primary Examiner* — Kimberly R Lockett

(57) ABSTRACT

Musical instrument support apparatuses can enable a performer to play an instrument in the standing position without supporting the instrument with a strap and without dampening vibrations from the instrument. In one example, a musical instrument support assembly includes a base to couple with a stand, two support arms including a first support arm coupled with a first end of the base with a first fastener, and a second support arm coupled with a second end of the base with a second fastener, and at least one support element coupled with each of the two support arms to support a musical instrument. At least one support element coupled with each of the two support arms includes an instrument securing element to contact and secure the musical instrument to the base.

23 Claims, 17 Drawing Sheets

MUSICAL INSTRUMENT SUPPORT APPARATUS

RELATED APPLICATIONS

The present application claims the benefit of priority of U.S. Provisional Patent Application No. 63/280,816, filed Nov. 18, 2021, entitled "MUSICAL INSTRUMENT SUPPORT APPARATUS," and U.S. Provisional Patent Application No. 63/389,224, filed Jul. 14, 2022, entitled "MUSICAL INSTRUMENT SUPPORT APPARATUS," the entire contents of which are incorporated herein by reference in their entirety.

FIELD

This disclosure relates generally to musical instrument support apparatuses and some examples relate more particularly to apparatuses to support a musical instrument while playing the instrument or performing.

BACKGROUND OF THE DISCLOSURE

It's common knowledge that sitting down for extended periods of time is detrimental to a person's health. These health risks include low energy expenditure, slower metabolism, compromised posture, back and spine injuries, and can even raise the risk of cardiovascular disease and cancer. Ergonomics in playing a musical instrument is applied through developing a posture that is optimized to enhance physical wellness and better overall system performance. While more research is needed in this field for musicians, playing an instrument in a sitting position can be detrimental to the health of the musician.

BRIEF DESCRIPTION OF THE DRAWINGS

So that the manner in which the features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

DETAILED DESCRIPTION

Figure 1A:
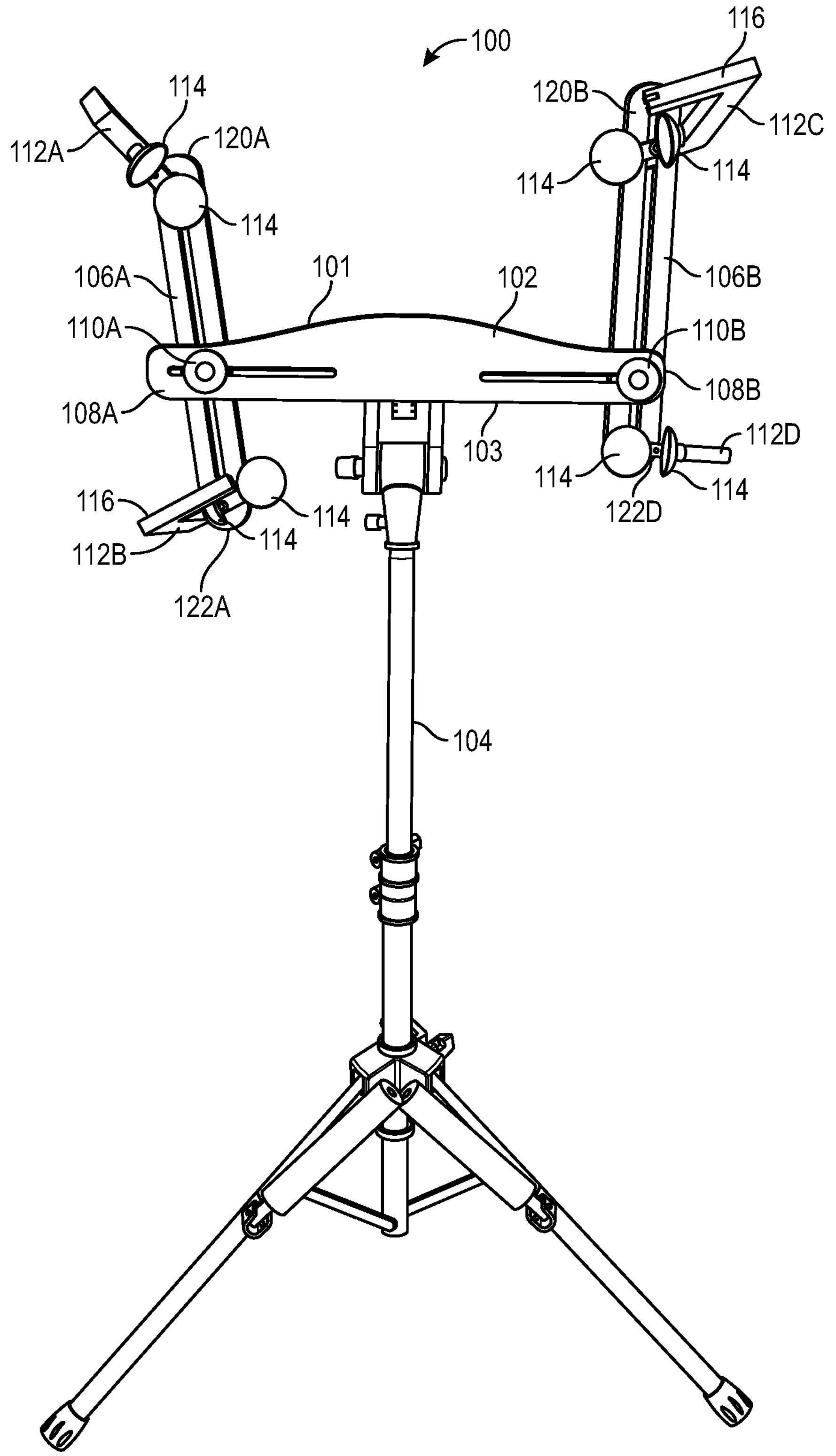
FIG. 1A illustrates a front view of an example of a musical instrument support apparatus.

Musical instrument support apparatuses are described herein.

Musicians are faced with several challenges while choosing a method of playing an instrument, be it sitting down or standing upright. For example, if a guitar player chooses to sit, they have to either use a stool to support the leg that the guitar rests on, or to use a support device that rests on the leg and attaches to the guitar with a clamp or suction cup. Some players negate both of these methods and balance the guitar between their leg, torso, and elbow to create enough pressure with their body on the instrument to keep it elevated and in place. Either way, the seated position leaves the player without the strength, balance, circulatory and respiratory support that a person typically gets with their legs while in an upright position.

Most conventional guitar supports currently require the guitarist to go to the guitar and mold their body around the instrument as a way of holding the guitar. The seated position when used with a footstool upsets the balance in the hips and spinal column and can cause damage to the disks and nerves in the lower back. Any seated position causes excessive stress and tension on the lower back and hips which are not intended for holding the torso upright for extended periods of time. Tension in the lower back makes it more difficult to relax the abdomen, which is typically used for breathing by expanding and therefore making space for the diaphragm to fill with oxygen. Additionally, when the lower back endures excessive tension, the upper back also tightens in order to keep the torso upright. A tense upper back creates tense arms, which then encourages ailments such as tendonitis. A natural breathing motion is made more difficult by playing in the sitting position because the player is typically hunching, or more specifically raising their shoulders and leaning forward, over the instrument. Other support devices that reduce the imbalance in the hips and spinal column are designed to be used while a player is in the sitting position.

In workplace settings, it is commonly known that a person is best able to work when on their feet. The standing position poses another challenge to musicians. For example, standing with a guitar, it is typically required that the performer use a strap to hang the instrument around the upper back, shoulders, and neck of the performer. The weight of an instrument hanging across the upper back, shoulders, and neck adds an excessive amount of stress to these areas, restricts relaxation, and increases tension to the extent that the upper lungs, which extend into the upper back and shoulders, are unable to relax or intake oxygen in the same way were they to be released from the tension of compressed shoulders and upper back. Additionally, the weight of the guitar can cause severe pain from exhausting the muscles in the upper back, shoulders, and neck. The upper back, shoulder, and neck muscles need to take a break in order to let the lungs breathe effectively. Lack of oxygen is a key component to muscle tension. With restricted oxygen intake, it's more difficult to achieve optimal relaxation as muscles require oxygen in order to relax.

Additionally, some conventional devices to support a guitar in an upright position use clamps that dampen vibrations of the guitar. Conventional clamp-based devices are not ideal for acoustic guitars which rely on the body of the instrument to vibrate in order to project the sound.

In contrast, the musical instrument support device described herein can enable the performer to play an instrument in the standing position without supporting the instrument with a strap and without dampening vibrations from the instrument. Unlike conventional instrument support devices, the musical instrument support described herein is designed to bring the guitar to the musician so that they can maintain their most efficient and ergonomic playing position. By keeping the instrument elevated, the player does not have to sit down and can access the strength and support from their legs, which lets the upper back and torso do what it does best, which is to breathe and support the activities of the arms. This upright position is ideal for keeping the shoulders relaxed, which in turn plays a role in letting the lungs fully expand into the upper back/shoulder area for optimal oxygen intake. In one example, the support device includes suction cups or another mechanism to keep the musical instrument on the device, which lets the instrument fully resonate.

According to one example, the support device is mounted or otherwise connected to a stand to elevate the support apparatus. In one such example, the apparatus and/or stand can be adjusted to the player's height and preferred angle for approaching the instrument. In one such example, the support apparatus and/or stand can be adjusted for use in a seated position.

In one example, adjustable support arms and support elements (e.g., hand joints) enable the support apparatus to hold instruments of different shapes and sizes. Moving arms and hand joints can also enable the instrument to fit at a variety of angles, and also make it usable for left and right-handed musicians.

Figure 1B:
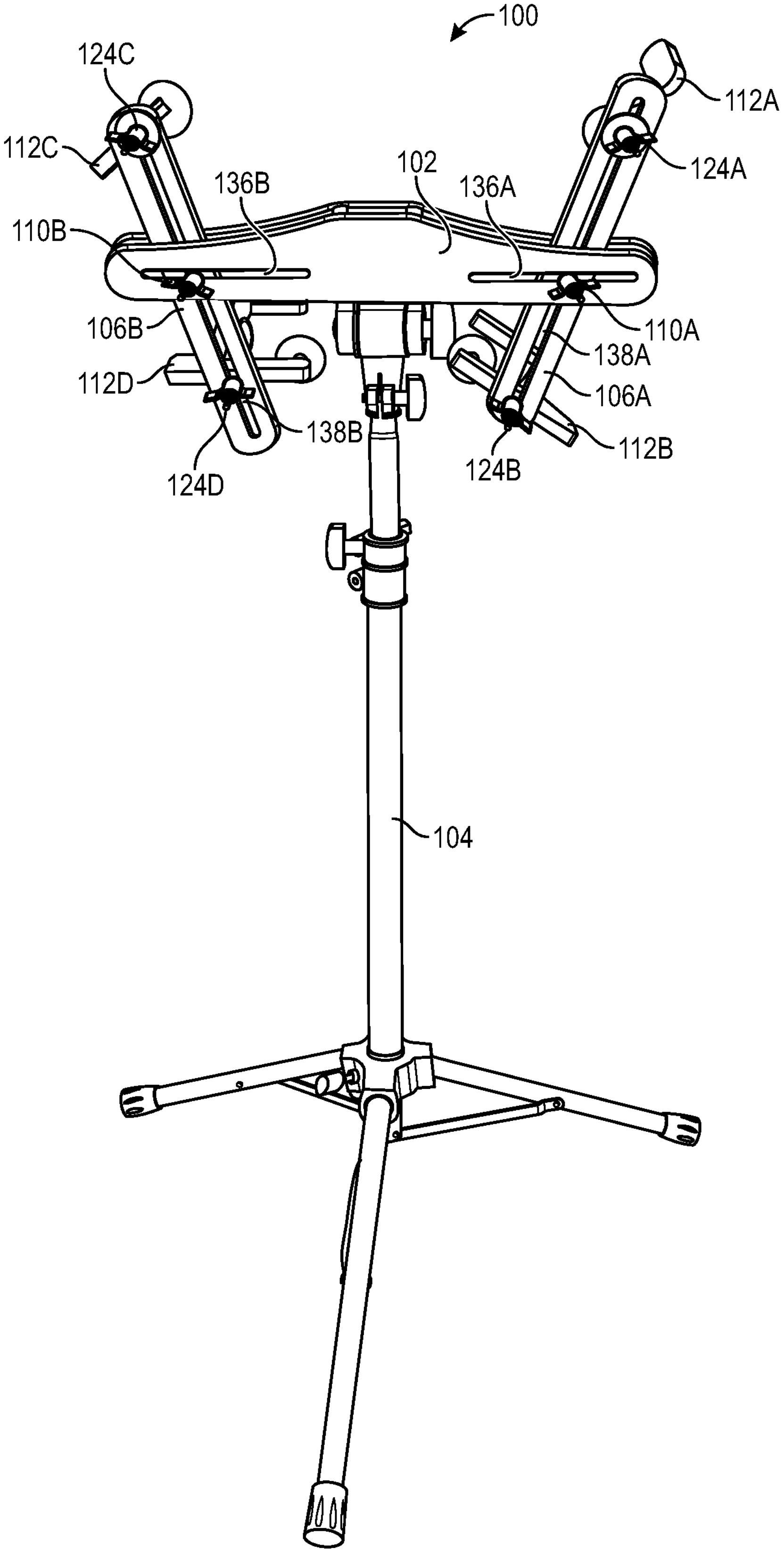
FIG. 1B illustrates a back view of an example of a musical instrument support apparatus.
Figure 1C:
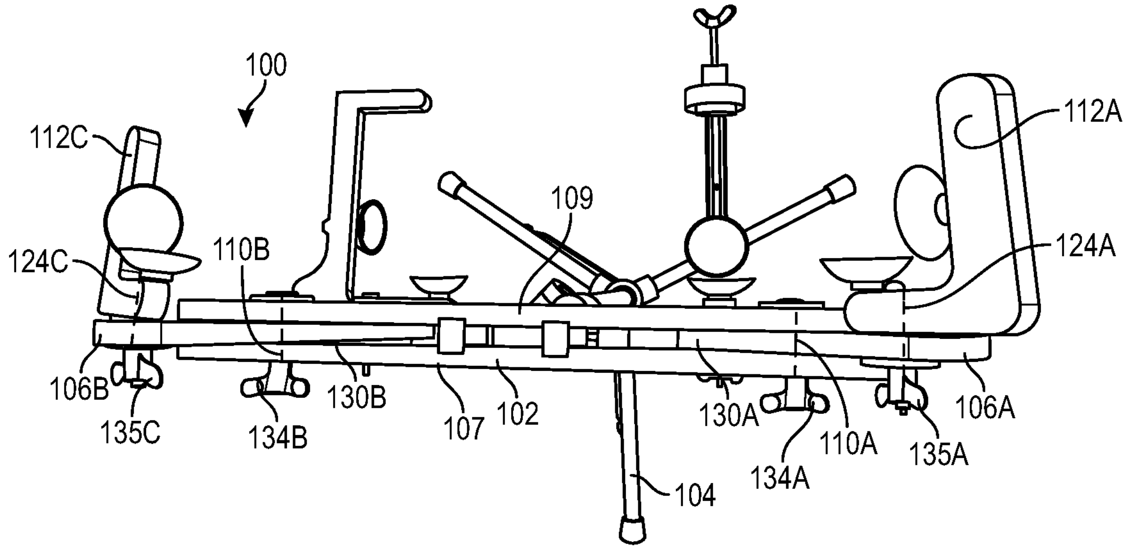
FIG. 1C illustrates a top-down view of an example of a musical instrument support apparatus.

FIGS. 1A and 1B illustrate front and back views of a musical instrument support apparatus 100 (also referred to herein as a musical instrument support assembly). FIG. 1C illustrates a top-down view of the musical instrument support apparatus 100.

Referring first to FIGS. 1A and 1B, the musical instrument support apparatus 100 is attached to or mounted on a stand 104 to elevate the musical instrument support apparatus from the floor or other supporting surface. The musical instrument support apparatus includes a base 102 to couple with the stand 104. In one example, at least one musical instrument support apparatus 100 may be coupled to the stand 104. In this example, two support arms 106A and 106B are coupled with the base. Specifically, a first support arm 106A is coupled with a first end 108A of the base 102 with a first fastener 110A and a second support arm 106B is coupled with a second end 108B of the base 102 with a second fastener 110B. Note that only the ends of the fasteners 110A and 110B are visible in FIGS. 1A and 1B. In FIG. 1C, the fasteners 110A and 110B are shown with dotted lines that passes through the opposing sides (e.g., front and back sides 107, 109) of the base 102 and through the arm being attached to the base 102. In the example illustrated in FIGS. 1A and 1B, the base 102 is made to resemble the chest/shoulders in that it supports the arms 106A and 106B of the apparatus 100. In the illustrated example, the base 102 has an elongated body (e.g., extending in a direction substantially parallel to the floor or supporting surface over which it is elevated) having two ends 108A and 108B to support the arms 106A and 106B. However, bases having other shapes and sizes are possible.

In one example, at least one support element is coupled with each of the two support arms to support a musical instrument. In one example, the musical instrument is coupled to the support elements. The support elements could also be referred to as "hands" or "hand joints" that are coupled with the support arms 106A, 106B to hold the musical instrument in or to the apparatus 100. In the example in FIGS. 1A-1C, there are two support elements coupled with each support arm. Specifically, the support element 112A is coupled with a first end 120A of the first support arm 106A with a fastener 124A, and the support element 112B is coupled with a second end 122A of the first support arm 106A with a fastener 124B. Similarly, the support element 112C is coupled with a first end 120B of the second support arm 106B with a fastener 124C, and the support element 112D is coupled with a second end 122D of the second support arm 106B with a fastener 124D. In the illustrated example, the support arms 106A and 106B are coupled with the base 102 at a point or portion of the support arm between two support elements. For example, the support arm 106A is attached to the base 102 between the support elements 112A and 112B. Note that only the ends of the fasteners 124A, 124B, 124C, and 124D are visible in FIG. 1B. In FIG. 1C, the fastener 124C is shown with a dotted line that passes through the arm 106B and support element 112C, and the fastener 124A is shown with a dotted line that passes through the arm 106A and the support arm 112A.

Figure 5A:
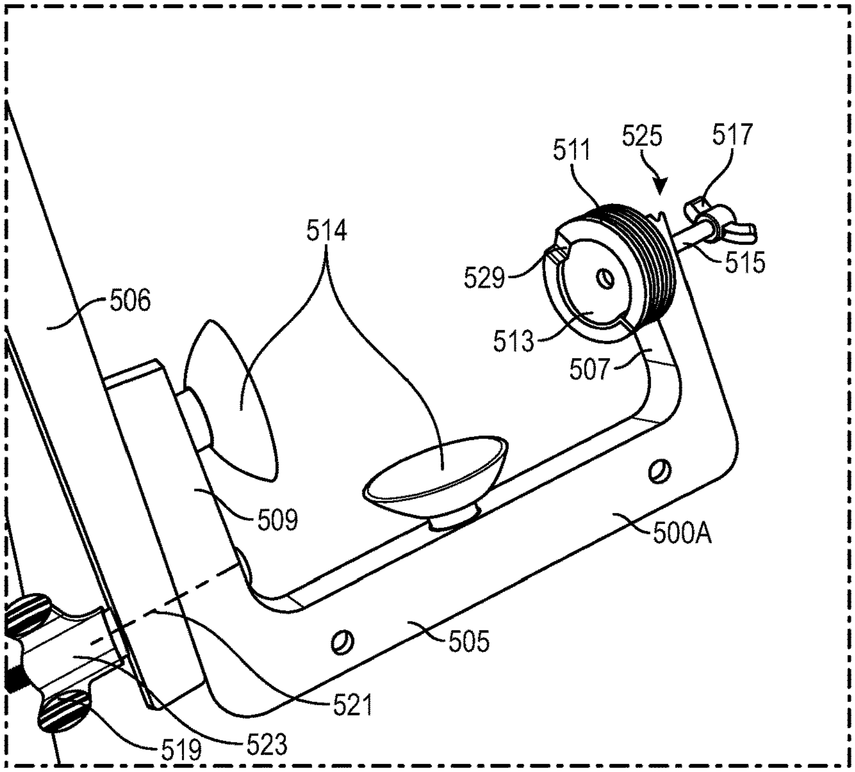
FIGS. 5A-5F illustrate examples of different support elements.
Figure 5B:
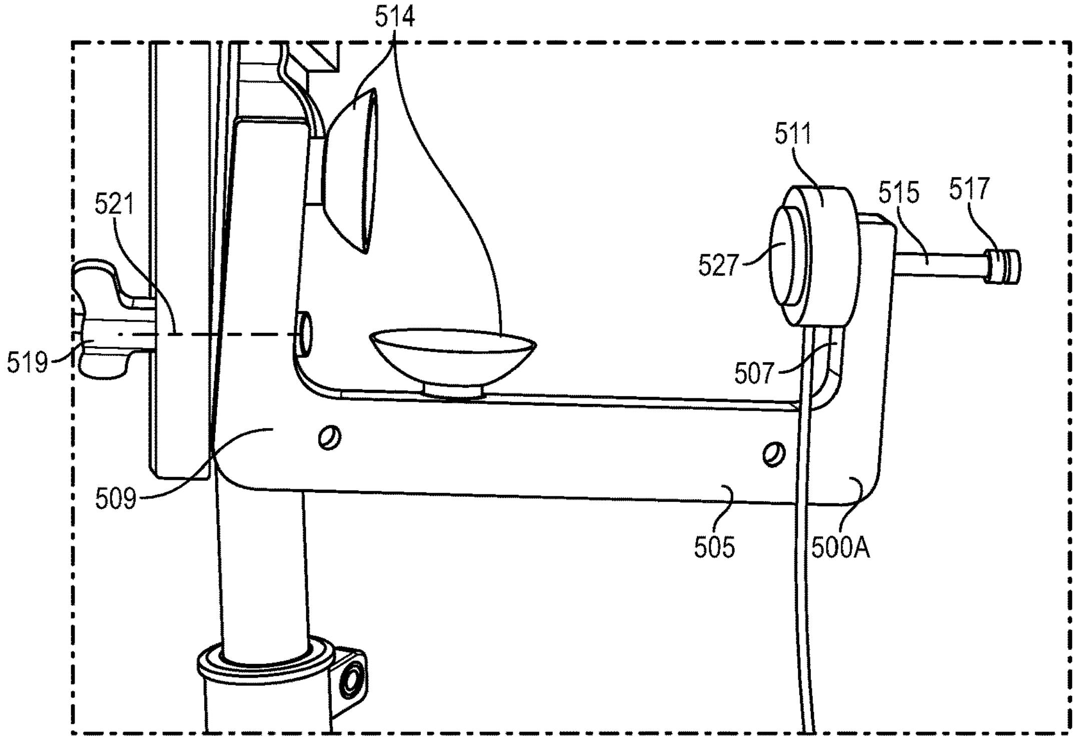

In one example, at least one support element includes an instrument securing element to contact and secure the musical instrument to the base. For example, the musical instrument support apparatus in FIGS. 1A-1C include suction cups 114 on all four of the support elements 112A-112D. In the illustrated example, there are two suction cups 114 on each of the support elements 112A-112D, although other examples may include one suction cup, more than two suction cups, or zero suction cups. In addition to the suction cups 114, two of the support elements of the apparatus 100 include a wraparound element to support the musical instrument. For example, FIG. 1A illustrates the support elements 112B and 112C as including a portion 116 to wrap around the musical instrument. FIGS. 5A and 5B, discussed below, include additional details of an exemplary support element with a wraparound portion. FIGS. 1B and 1C illustrate a different configuration of support elements than FIG. 1A. Specifically, in FIGS. 1B and 1C, the support elements 112B and 112D include a wraparound portion. Thus, in one example, the musical instrument support apparatus 100 is configurable in the sense that the type of support element(s) on the support arms 106A and 106B can be interchanged, in addition to adjusting angles, positions, and even the number of support elements coupled with the support arms 106A and 106B.

Referring again to instrument securing elements, examples of instrument securing elements include: suction cups, magnets, clamps, wraparound elements, sticky or adhesive elements, or any other element that can grip, hold, or otherwise secure a musical instrument in or to the base 102. Securing elements that grip (such as suction cups or other elements to grip the instrument) may be referred to as gripping elements. The support elements 112A-112D can include a single type of instrument securing element, or a combination of instrument securing elements. Also, the different support elements 112A-112D can include the same type(s) or different type(s) of instrument securing elements.

For example, the support elements 112B and 112C of FIG. 1A include a wraparound portion 116 and suction cups 114, while the support elements 112A and 112D of FIG. 1A include suctions cups 114, but not a wraparound portion. In another example, only one or some of the support elements include one or more clamps. In other examples, all the support elements can include a clamp.

In one example, one or more of the support arms and support elements are rotatably and/or slidably attached. For example, the first support arm 106A is rotatably attached to the base 102 with the first fastener 110A, enabling the first support arm 106A to rotate about the first fastener 110A when the first fastener 110A is loosened. Similarly, the second support arm 106B is rotatably attached to the base 102 with the second fastener 110B to enable the second support arm 106B to rotate about the second fastener 110B when the second fastener 110B is loosened. In one such example, the fasteners 110A and 110B include threaded fasteners, such as screws (e.g., machine screws), bolts, or other threaded fasteners. As illustrated in the example in FIG. 1C, an adjusting mechanism 134B coupled with the fastener 110B, such as a wingnut, thumbscrew, or other tightening and loosening mechanism, enables the support arm 106B to rotate about the fastener 110B when loosened, and become secure (e.g., kept in place) in its position and angle relative to the base 102 when tightened. Similarly, an adjusting mechanism 134A coupled with the fastener 110A enables the support arm 106A to rotate about the fastener 110A when loosened, and become secure (e.g., kept in place) in its position and angle relative to the base 102 when tightened. Thus, the angles of the two support arms 106A and 106B relative to the base 102 are independently adjustable via rotation of the first support arm 106A about the first fastener 110A and rotation of the second support arm 106B about the second fastener 110B.

In one example, the attachment points of the two support arms 106A and 106B to the base 102 are independently adjustable. For example, as depicted in FIGS. 1A and 1B, the base 102 includes a slot 136A through which the fastener 110A passes to rotatably and slidably couple the arm 106A to the base 102. Similarly, the base 102 includes a slot 136B through which the fastener 110B passes to rotatably and slidably couple the arm 106B to the base 102. In one such example, horizontal slots 136A and 136B along the length of the base 102 enable the support arms to rotate and slide along the slots when the corresponding fasteners are loosened to adjust the location of the support arms 106A, 106B relative to the base 102 as well as the angle of the support arms 106A, 106B relative to the base 102. In one example, spaces or slots have been routed out of the pieces(s) used to form the base 102 to create horizontal routed slots 136A and 136B.

Although the slots 136A and 136B are shown as being substantially parallel to the length of the base 102 and the floor or supporting surface over which the apparatus 100 is supported, in other examples, the base could include slots at a non-zero angle relative to the length of the base 102. In another example, instead of slots, separate openings (e.g., holes) to receive the fasteners at different points on the base can enable adjusting the musical instrument support to support a variety of instruments. In one such example, rather than sliding the fastener along one of the slots 136A or 136B, the fastener could be removed and reinserted into the desired hole to adjust the attachment point of the support arm to the base 102. Thus, the configurability of the position and angle of the support arms 106A and 106B can be achieved with mechanisms other than the slots 136A and 136B, however, the slots 136A and 136B enable adjusting the arms 106A and 106B without completely removing the fasteners 110A and 110B from the base, and also enable configurability at a fine granularity to support a wide range of instrument sizes and shapes.

In one example, the support elements are configured to rotate or swivel 360 degrees on the support arms. For example, as can be seen in FIG. 1C, the support element 112C is rotatably attached to the support arm 106B with a fastener 124C, enabling the support element 112C to rotate about the fastener 124C when the first fastener 124C is loosened. Similarly, the support element 112A is rotatably attached to the support arm 106A with a fastener 124A, enabling the support element 112A to rotate about the fastener 124A when the first fastener 124A is loosened. In one such example, the fasteners 124A and 124C include threaded fasteners. As illustrated in the example in FIG. 1C, an adjusting mechanism 135C coupled with the fastener 124C to enable the support element 112C to rotate about the fastener 124C when loosened, and become secure (e.g., kept in place) when the fastener 124C is tightened. Similarly, an adjusting mechanism 135A coupled with the fastener 124A to enable the support element 112A to rotate about the fastener 124A when loosened, and become secure (e.g., kept in place) when the fastener 124A is tightened. The fasteners 124A, 124C and the adjusting mechanisms 135A, 135C may be the same, or similar to, the fasteners 110A, 110B and adjusting mechanisms 134A, 134B discussed above. Although not clearly depicted in Figure C, the support elements 112B and 112D can be similarly coupled with the support arms 106A and 106B, respectively. Thus, the angles of the support elements relative to the arms are independently adjustable via rotation of the support elements. In one such example, rotating the support elements enables the suction cups 114 (or other securing elements) to suction onto the instrument that the apparatus is supporting.

In addition to adjusting the angle of the support elements, in one example, the attachment point of each of the support elements on the support arms is independently adjustable. In one such example, each of the two support arms 106A and 106B include one or more slots 138A and 138B, respectively. In one such example, the support elements are rotatably and slidably attached with the corresponding support arm along the one or more slots in the support arm via a fastener through the one or more slots of the support arm. For example, the support elements 112A and 112B are slidably and rotatably attached with the support arm 106A with the fasteners 124A and 124B, respectively, through the slot 138A. Similarly, the support elements 112C and 112D are slidably and rotatably attached with the support arm 106B with the fasteners 124C and 124D, respectively, through the slot 138B. In one such example, the slots 138A and 138B along the length of the support arms 106A and 106B, respectively, enable the support elements to rotate and slide along the slots when the corresponding fasteners are loosened to adjust the location of the support elements relative to the support arm as well as the angle of the support elements relative to the support arm. In another example, instead of slots, separate openings (e.g., holes) to receive the fasteners at different points on the support arms can enable adjusting the musical instrument support to support a variety of instruments. In one such example, rather than sliding the fastener along one of the slots 138A or 138B, the fastener could be removed and reinserted into the desired hole to adjust the attachment point of the support elements to the corresponding support arm.

In one example, the extent of protrusion of the two support arms 106A, 106B from a top or bottom of the base 102 is adjustable via loosening of the fastener through the one or more slots of the support arm and tightening the fastener once the support arm is in the desired position. For example, the amount that the support arm 106A protrudes from the top 101 of the base 102 or bottom 103 of the base 102 can be adjusted by loosening the fastener 110A, sliding the arm up or down along the slot 138A, and retightening the fastener 110A when the support arm 106A is in the desired position and at the desired angle. Similarly, the amount that the support arm 106B protrudes from the top 101 of the base 102 or bottom 103 of the base 102 can be adjusted by loosening the fastener 110B, sliding the arm up or down along the slot 138B, and retightening the fastener 110B when the support arm 106B is in the desired position and at the desired angle. Thus, in accordance with examples described herein, the arms 106A and 106B can be independently adjusted to the desired angle, attachment point along the base, and protrusion from the top 101 or bottom 103 of the base 102.

Referring again to FIG. 1C, the apparatus 100 includes a base with two opposing side surfaces 107, 109 (e.g., front and back surfaces) between the top 101 and the bottom 103 of the base 102. In one such example, each of piece (such as a plank or other member) forming one of the side surfaces 107, 109 has two identical (e.g., matching) spaces or slots that have been routed out to create horizontal routed spaces 136A and 136B. In one example, the routed spaces form two slots 136A and 136B extending through the two opposing side surfaces of the base 102. Referring again to the example illustrated in FIG. 1C, the base 102 includes one or more slots 130A and 130B (or gaps or openings) that extend from the top 101 of the base 102 to the bottom 103 of the base 102 between the two opposing side surfaces 107, 109. In this example, the two support arms 106A, 106B are coupled with the base 102 through the one or more slots 130A, 130B of the base 102 between the two opposing side surfaces 107, 109. In one example, the base 102 is made of two horizontal planks that are glued (or attached via another means) on either side of a board create space (e.g., the slots 130A and 130B) between the planks. However, the openings or slots 130A and 130B in the base 102 can be formed via other techniques. In the illustrated example, the slots 130A, 130B extend vertically all the way through the base 102 (e.g., from the top 101 through to the bottom 103). However, in other examples, the slots 130A, 130B may not extend all the way through the base but are at least deep enough to receive the ends of the arms 106A and 106B.

Figure 2:
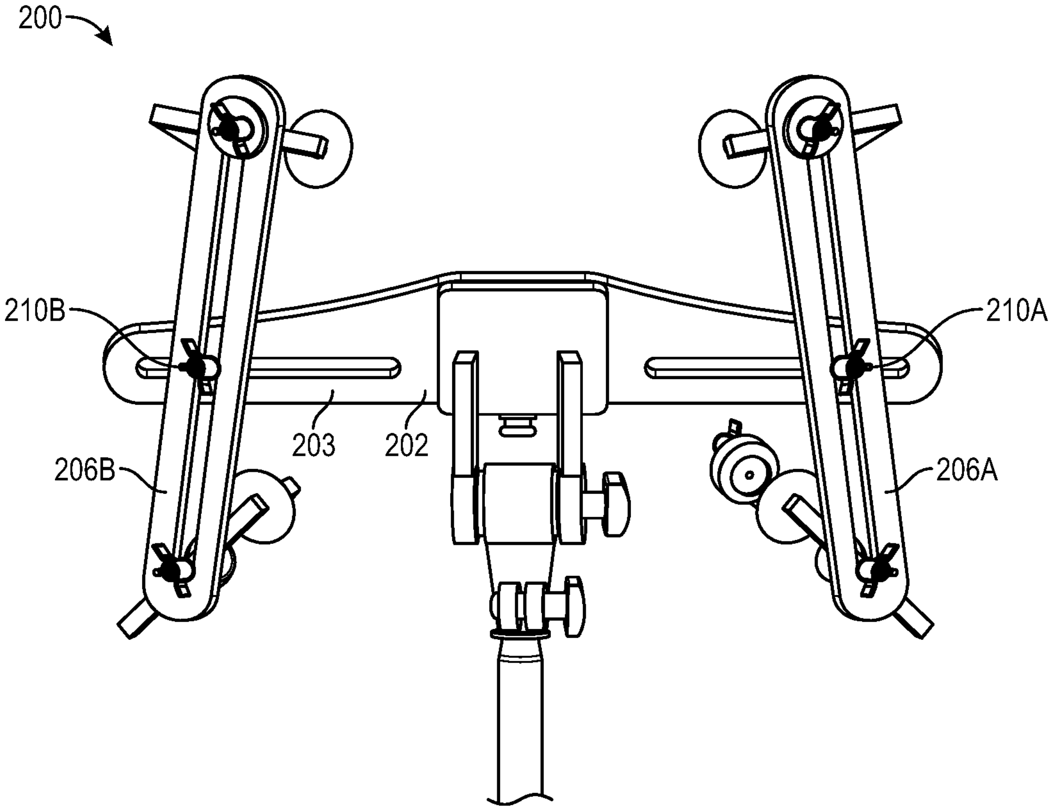
FIG. 2 illustrates the back side of an example of a musical instrument support apparatus.

In other examples, the support arms may attach to the base without passing through a vertical slot in the base. For example, FIG. 2 illustrates the back side of an instrument support apparatus 200 with a base 202. Unlike the base 102 of FIGS. 1A-1C, in which the base includes a space between the two side faces through which the support arms can pass, the support arms 206A and 206B in FIG. 2 are attached to a side 203 (e.g., side surface) of the base 202 with fasteners 210A and 210B, respectively. Note that although both support arms 206A and 206B in FIG. 2 are attached with the same face or side 203 of the base 202, in other examples, the support arms could be attached with opposite faces of the base 202 (e.g., the support arm 206B could be attached with the face of the base opposite to face 203 (not shown) of the base 202).

Figure 3B:
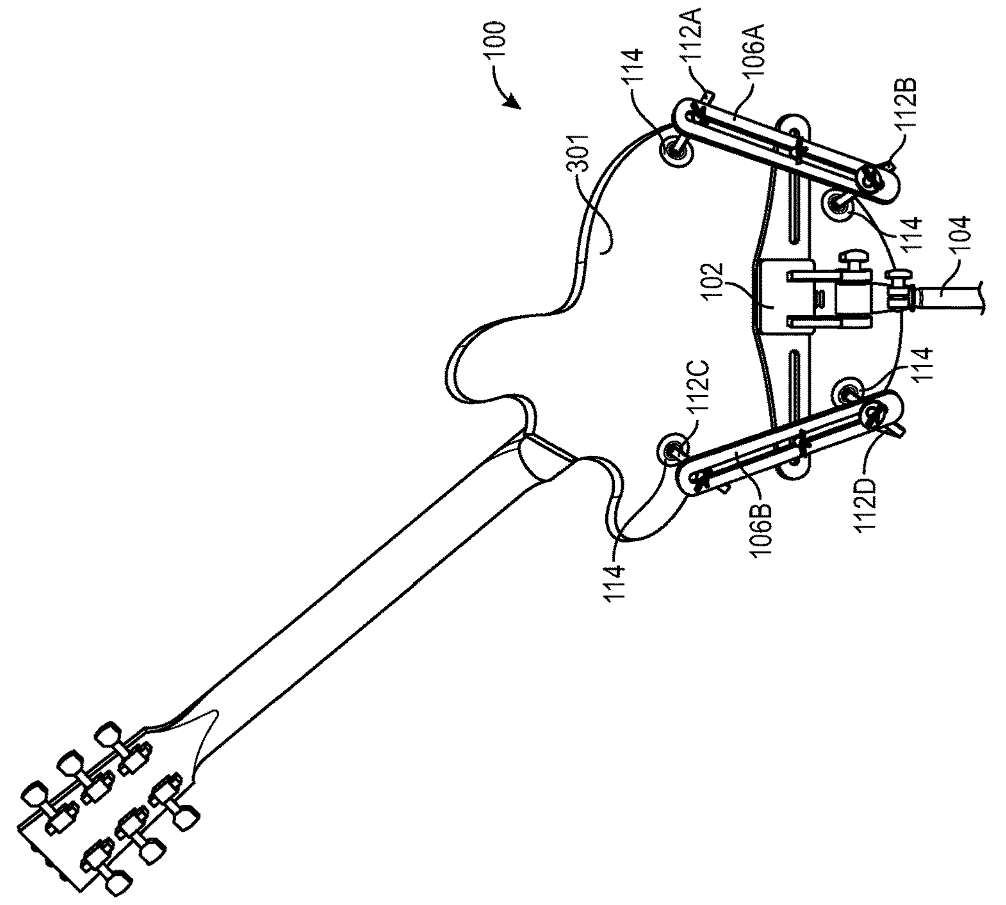
FIG. 3B illustrates a back view of an example of a musical instrument support apparatus supporting a guitar.
Figure 3A:
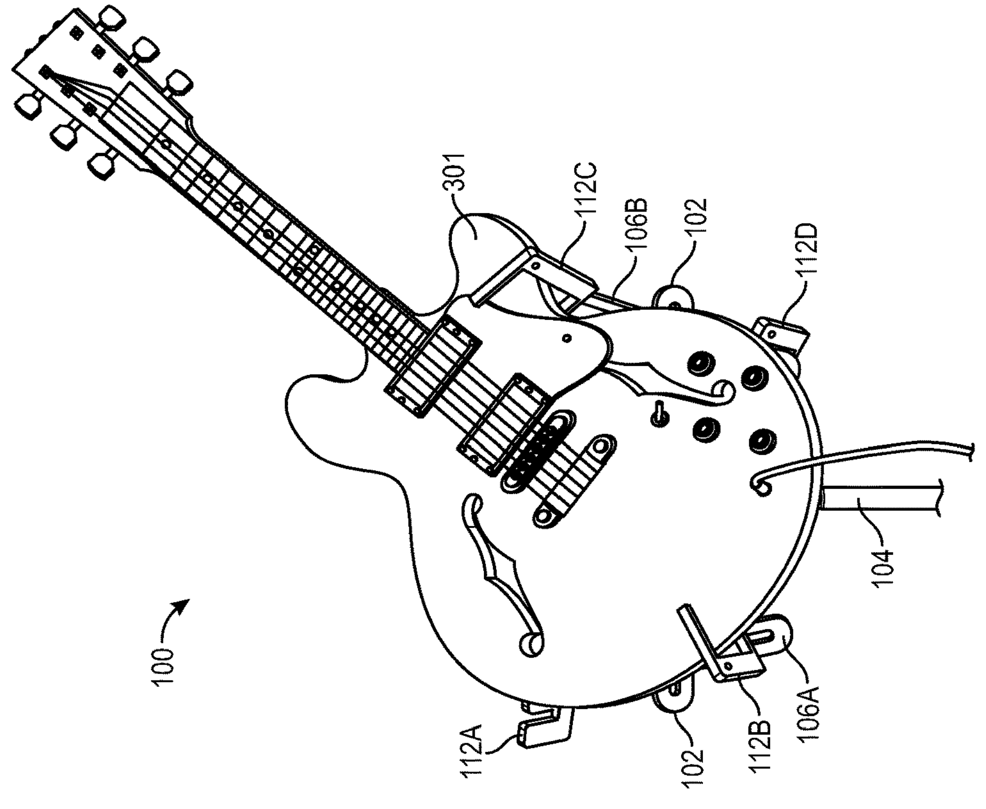
FIG. 3A illustrates a front view of an example of a musical instrument support apparatus supporting a guitar.

FIGS. 3A and 3B illustrate front and back views of an example of the musical instrument support apparatus 100 of FIG. 1A supporting a guitar 301. As can be seen in FIGS. 3A and 3B, the musical instrument support apparatus 100 is attached to the stand 104 to support the guitar 301 and elevate the guitar 301 off the ground at the desired height. Suction cups 114 are removably attached to the guitar 301 to secure the guitar 301 to the base 102. In one example, the weight of the guitar 301 applies pressure to the suction cups 114. In the illustrated example, two of the support elements 112B and 112C include a portion that wraps around the front of the guitar to add an additional element of support. In one such example, the wraparound portion of the support elements 112B and 112C provide a back-up means of support in case the suction cups 114 fail to secure the instrument. The musical instrument support apparatus thus enables a musician to adjust the guitar 301 to the desired height and position to play the guitar 301 in a standing or sitting position without compromising the musician's posture. Note that the guitar 301 illustrated in FIGS. 3A and 3B is one example of an instrument that may be supported using the musical instrument support apparatus 100. In one example, the support apparatus 100 is designed to support instruments of varying shapes and sizes (e.g., stringed instruments such as a guitar, ukulele, lute, cello, bass, banjo, mandolin, oud, saz or other stringed instrument, percussion instruments (e.g., box drum, darbuka, or other percussion instrument), or other instruments).

Figure 4A:
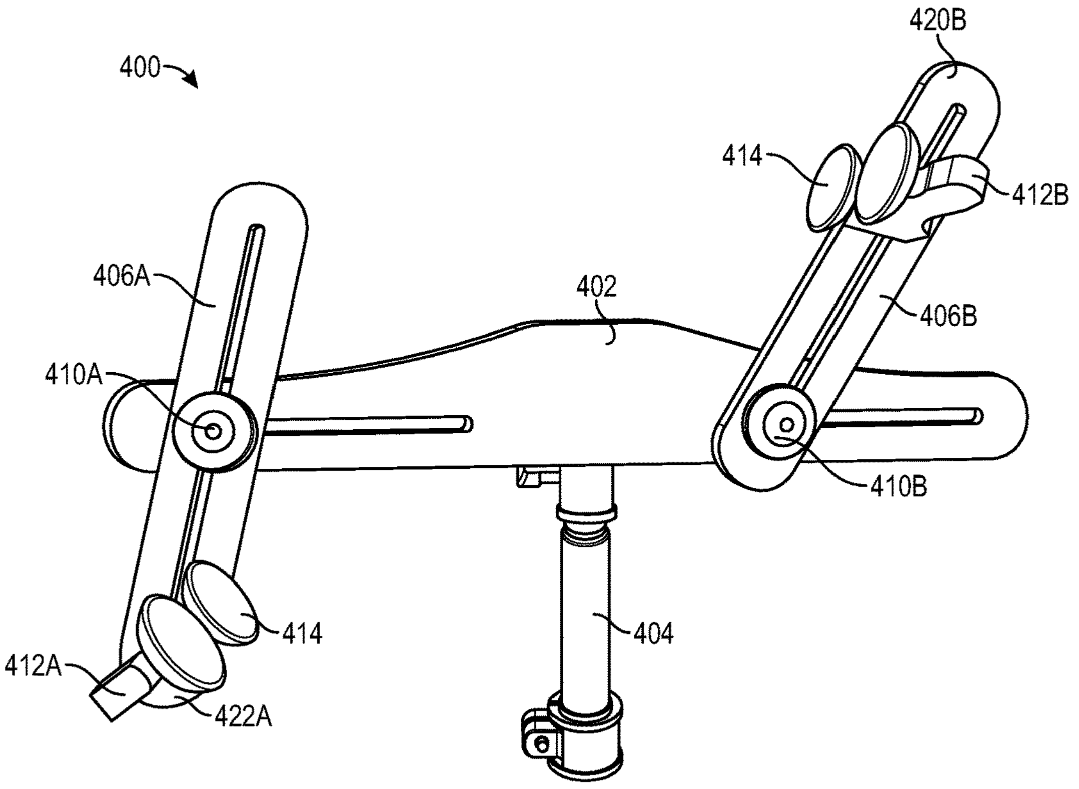
FIG. 4A illustrates a front view of an example of a musical instrument support apparatus.
Figure 4B:
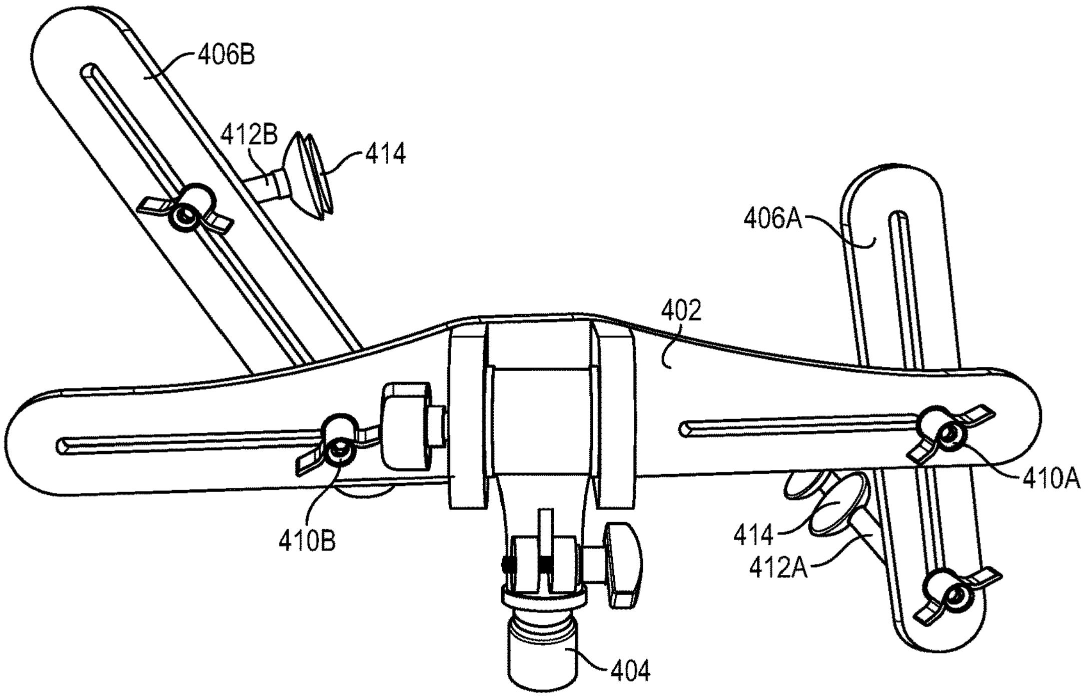
FIG. 4B illustrates a back view of an example of a musical instrument support apparatus.

The examples in FIGS. 1A-1C, 2, and 3A-3B illustrate a musical instrument support apparatus with two support elements on each support arm. However, other examples may include a single support element on one or both support arms. For example, FIGS. 4A and 4B illustrate front and back views of an example of a musical support apparatus 400 with a single support element on each support arm. Specifically, the musical instrument support apparatus 400 includes one support element 412A attached with one end 422A of the support arm 406A, and one support element 412B attached with one end 420B of the support arm 406B. Like the musical instrument support apparatus 100 of FIGS. 1A-1C, the support arms 406A and 406B are coupled with the base 402 via fasteners 410A and 410B, respectively, and the base is coupled with a stand 404. In the illustrated example, each support element 412A and 412B includes two suction cups 414, although as discussed above with respect to FIG. 1A, the support elements 412A and 412B may each include additional or different mechanisms to grip or otherwise secure the instrument in addition to, or instead of, the suction cups 414 illustrated in FIGS. 4A and 4B.

FIGS. 5A-5F illustrate examples of different support elements. Turning first to FIGS. 5A and 5B, the support element 500A includes a first portion 505 (e.g., bottom portion) to support a musical instrument on one side of the musical instrument, and a second portion 507 (e.g., front portion) to wrap around a second side (e.g., front side) of the musical instrument. In the example of FIGS. 5A and 5B, third portion 509 (e.g., back portion) wraps around a third side (e.g., back side) of the musical instrument. In the illustrated example, the support element 500A includes two opposing portions 507 and 509 to cradle or create a seat for the musical instrument. In one such example, the portion 509 supports a back of the instrument, the portion 505 supports a bottom of the instrument, and the portion 507 supports a front side of the instrument. In one such example, the back and bottom portions 509 and 505 directly support the instrument, while the front portion 507 may provide a safeguard to prevent the instrument from falling from the apparatus. In another example, the weight of the instrument is providing stability and additional security to the support element 500A including portions 505, 507, and 509. In another example, the front portion 507 is adjustable (e.g., with a clamp) to directly hold and support the instrument. In the example of FIGS. 5A and 5B, the protruding end 525 of the support element is L-shaped, however, other support elements with a wraparound portion may have different shapes.

The portion 509 of the support element 500A can also provide a connection point to the support arm 506. For example, the support element 500A is coupled with the arm 506 with a fastener 521 which passes through portion 509 of the support element 500A. In the illustrated example, a wingnut 519 (or thumbscrew, knob, or other adjusting mechanism) and washer 523 on the fastener 521 enable the pressure applied to the support arm 506 and support element 500A to be increased or decreased to tighten or loosen the support element 500A to the support arm 506. In one such example, when the wingnut 519 is loosened, the support element 500A can rotate about the fastener 521 to adjust the angle of the support element 500A relative to the support arm 506, base, and instrument. In this way, the support elements are adjustable to hold various sized and shaped musical instruments. Suction cups 514 are included on the support element 500A to secure the musical instrument to or in the support element 500A, and thus to secure the instrument in the apparatus.

The support element 500A also includes a clamp or clamping mechanism to clamp the musical instrument into place. The clamp of the support element 500A includes an instrument contacting element 511 to contact and apply pressure to the instrument by tightening an adjusting mechanism 517 on a fastener 515. In one example, the instrument contacting element 511 is a pickup holder that includes a recess 513 to receive an electric pickup element 527 to contact the musical instrument when the clamp is tightened. In one example, the electric pickup element 527 includes a piezo pickup. In one example, the electric pickup element 527 includes an electronic audio and radio transmission mechanism or otherwise wireless microphone. In one example, the electric pickup element 527 does not need to contact the instrument to transmit any frequencies from the instrument or the support apparatus 100 when the clamp is tightened or loosened. In the illustrated example, the pickup holder includes a groove or cutout 529 through which the cable or cord of the pickup element 527 can pass, which can enable the pickup element to be evenly seated in the pickup holder to enable uniform contact with the instrument. As discussed above with respect to FIG. 1A, the support element 500A may include other or different mechanisms to grip or otherwise secure the instrument in addition to, or instead of, the suction cups 514, the wraparound element of portion 507, and a clamp.

Figure 5C:
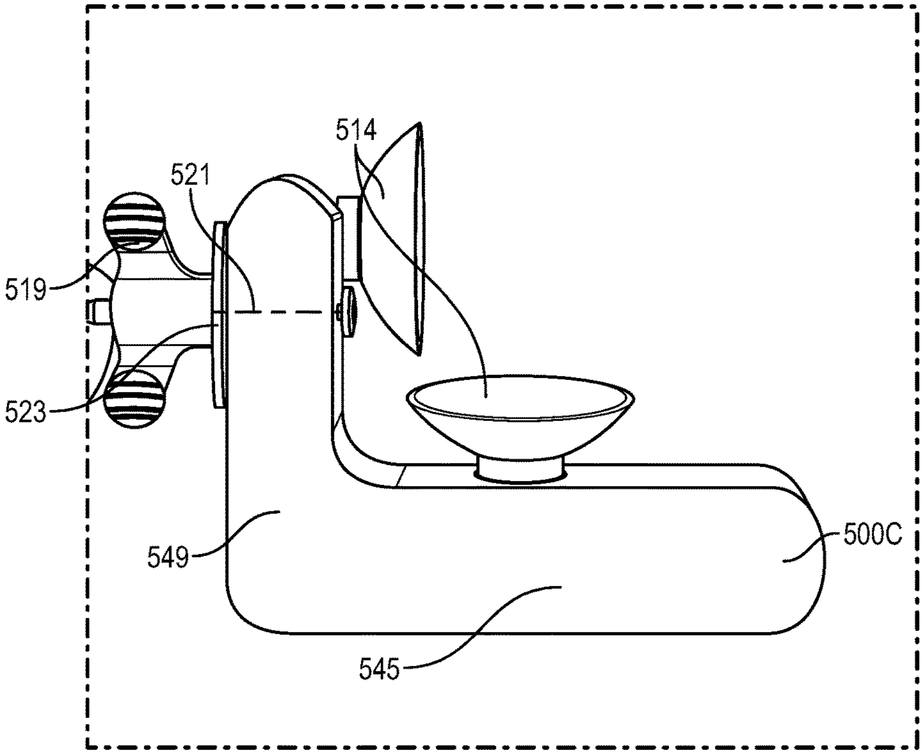

Now referring to FIG. 5C, the support element 500C includes a first portion 549 (e.g., back portion) and a second portion 545 (e.g., bottom portion) to support a musical instrument. In the illustrated example, a fastener 521 passes through the back portion 549 and a support arm (not shown in FIG. 5C) to couple the support element 500C to the support arm. A wingnut 519 (or thumbscrew or other adjusting mechanism) and washer 523 on the fastener 521 enable the pressure applied to the support arm 506 and support element 500C to be increased or decreased to tighten or loosen the support element 500C on the support arm. The support element can then be adjusted in a similar way as described with respect to FIGS. 5A and 5B. The bottom and back portions 545, 549 each include suction cups 514 to secure the musical instrument. However, as discussed above with respect to FIG. 1A, the support element 500C may include additional or different mechanisms to grip or otherwise secure the instrument in addition to, or instead of, the suction cups 514. Unlike the support element in FIGS. 5A and 5B, the support element 500C does not include a portion configured to wrap around the front of the instrument.

Figure 5D:
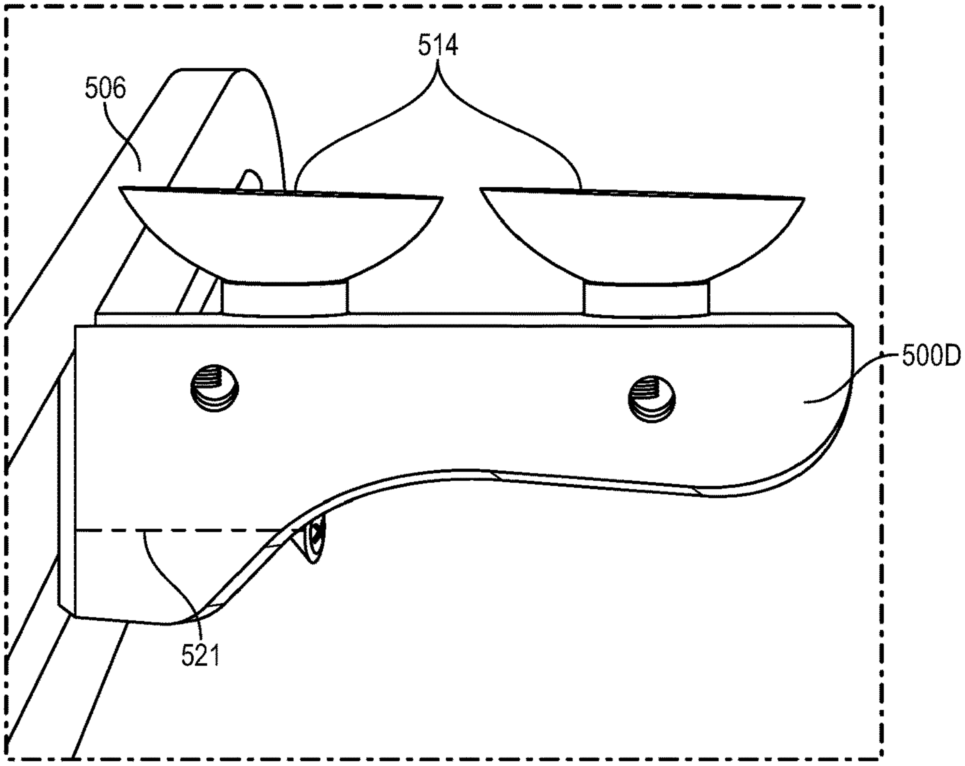

FIG. 5D illustrates an example of another support element 500D. Unlike the support elements in FIGS. 5A-5C that support a musical instrument from two or three sides, the support element 500D supports a musical instrument on a single side. The support element 500D illustrated in FIG. 5D includes two suction cups 514 to secure the instrument to the support element; however, as discussed above with respect to FIG. 1A, the support element 500D may include additional or different mechanisms to grip or otherwise secure the instrument in addition to, or instead of, the suction cups 514. The support element 500D is attached to an arm 506 with a fastener 521. An adjusting mechanism, such as a wingnut, thumbscrew, or other tightening and loosening mechanism (not shown in FIG. 5D) enable the pressure applied to the support arm 506 and support element 500D to be increased or decreased to tighten or loosen the support element 500D. The support element can then be adjusted in a similar way as described with respect to FIGS. 5A and 5B.

Figure 5E:
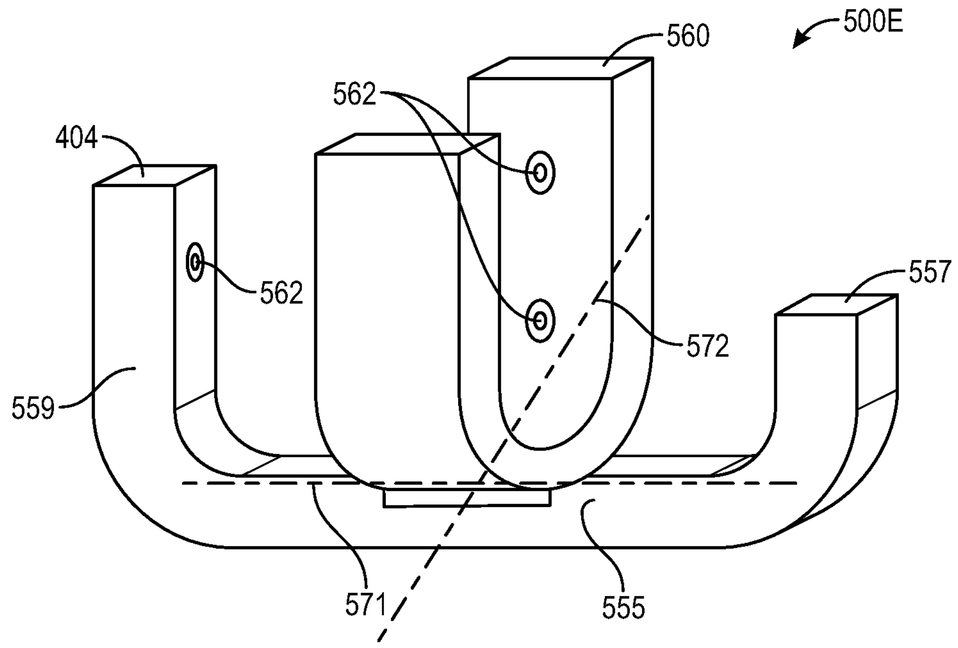
Figure 5F:
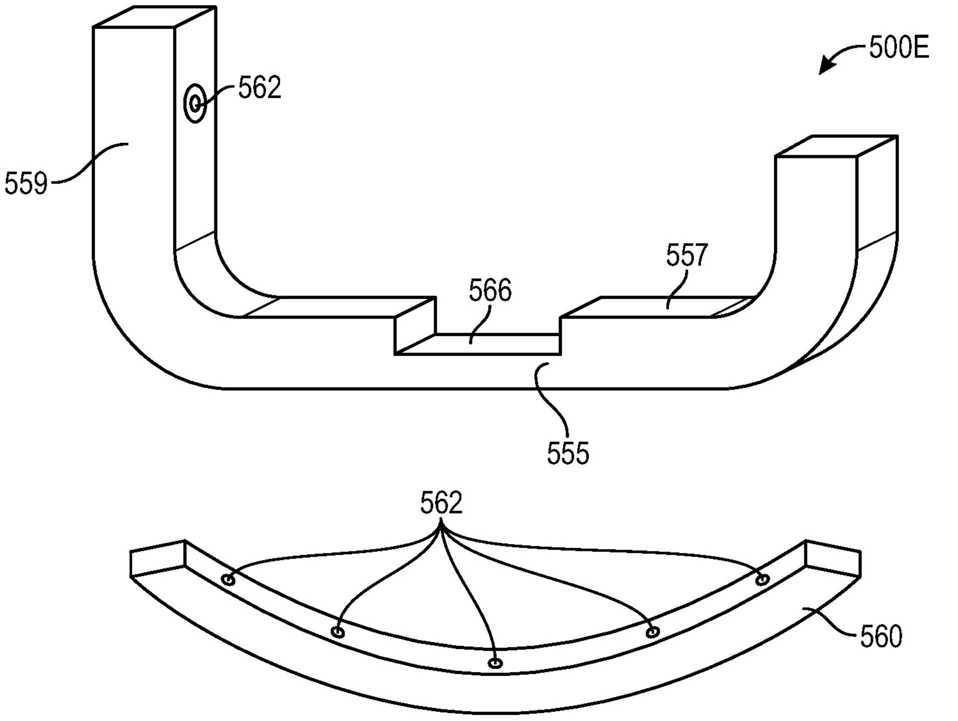

FIGS. 5E and 5F illustrate an example of a support element 500E including a portion to support the instrument along a second axis. Like the support element 500A of FIGS. 5A and 5B, the support element 500E includes portions 555, 557, and 559 to provide support for an instrument along an axis 571. In one such example, the portions 555, 557, and 559 can support an instrument from front to back of the instrument. The support element 500E also includes portion 560 to provide support along a second axis 572. In one example, the portion 560 extends along an axis 572 perpendicular to the axis 571 along which the portions 555, 557, and 559 extend. However, the portion 560 may be at a non-perpendicular angle relative to the portions 555, 557, and 559 (e.g., for example, if a support elements on the two support arms have different lengths). In one example, the portion 560 supports the musical instrument along its side, while the portions 555, 557, and 559 support the instrument back to front. In the illustrated example, the portion 560 is attached to approximately the middle of the portion 555. In one example, the portion 555 include a groove 566 to receive the portion 560. In one such example, the portion 560 can be attached to the portion 555 with glue, a fastener, or other attachment mechanism. In the illustrated example, the portions 559 and 560 include one or more securing elements 562 to secure the musical instrument to the apparatus. Any securing element may be used, such as those discussed above with respect to FIGS. 1A-1C.

Figure 6A:
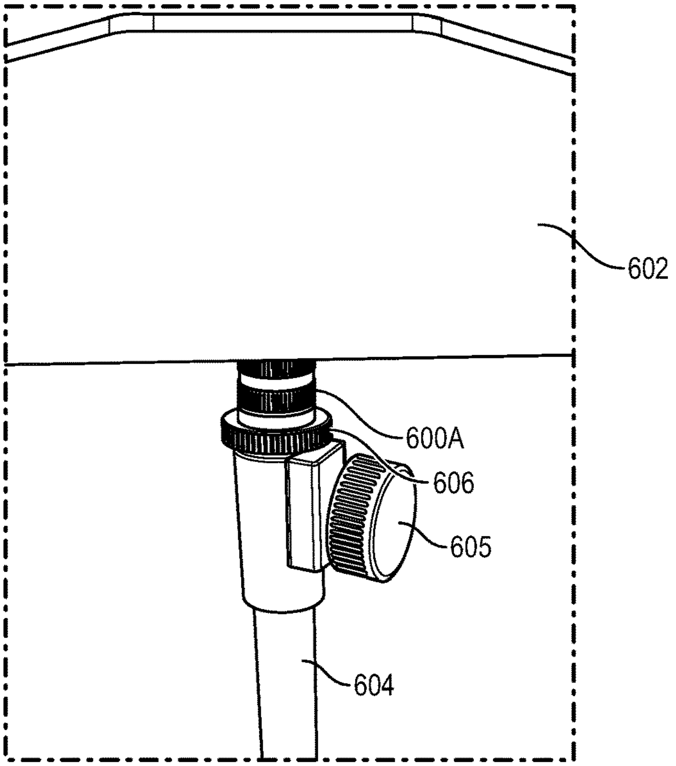
FIGS. 6A and 6B illustrate examples of adapters to couple with a stand.
Figure 6B:
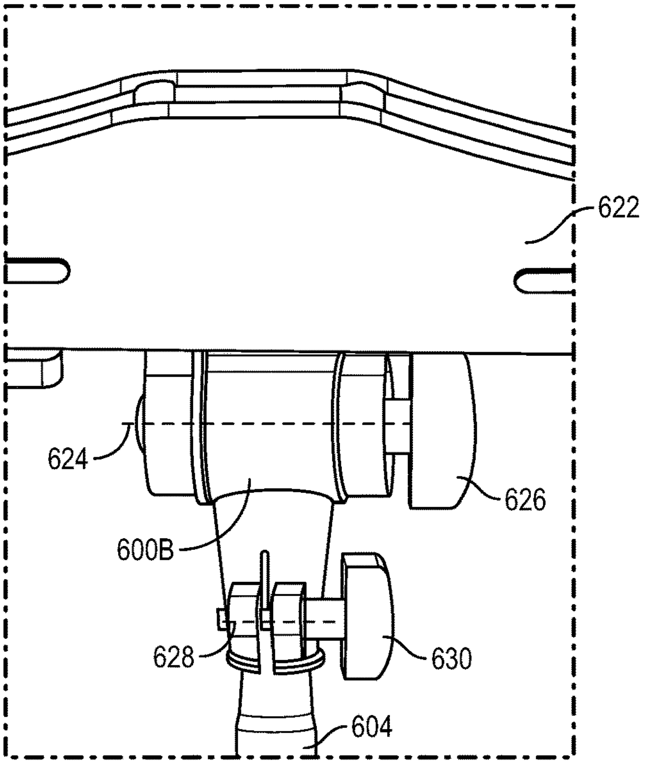

FIGS. 6A and 6B illustrate examples of adapters to couple with a stand. FIG. 6A illustrates an example of a base 602 that includes an adapter 600A to couple with a screw-on locking ball socket adapter 606 of a stand 604, such as a microphone stand. In one such example, the entire musical instrument support apparatus can rotate about the axis of the stand 604 via rotation of the stand's ball socket adapter 606. In one example, the ball socket of the adapter 606 can be tightened and loosened to let the base 602 be firm or loose on the stand 604. The ball socket when loose is able to rotate the device 360 degrees across the X-axis, as well as tilted across the Y-axis up to 90 degrees. The device can be utilized while firm or loose within these planes. The knob 605 can be rotated to tighten or loosen the fastener to enable adjusting the height of the stand 604. In other examples, the base of a musical instrument support apparatus can be mounted without a locking ball socket for extra stability.

FIG. 6B illustrates another example of a base 622 with an adapter 600B to couple with a stand 604. The adapter 600B is attached with the base 622 via a fastener 624. An adjusting mechanism 626 can be loosened to enable the base 622 to rotate about the fastener 624 and tightened to secure the base 622 in the stand 604. Thus, in one example, the base 622 can tilt front to back to adjust the desired angle of the base 622 relative to the floor or other supporting surface. The adapter 600B is coupled with the stand 604 via another fastener 628. A tightening mechanism 630 can be loosened to enable the apparatus to be removed from the stand 604 and tightened to secure the apparatus in the stand 604.

Thus, in some examples the base includes a stand adapter to couple with a stand. In one such example, the stand adapter includes a fastener to loosen to rotate the base about the fastener and tighten to secure the base in a position relative to the stand.

FIGS. 7A-7F illustrate examples of different types of stands with which a musical instrument support apparatus may be used.

Figure 7A:
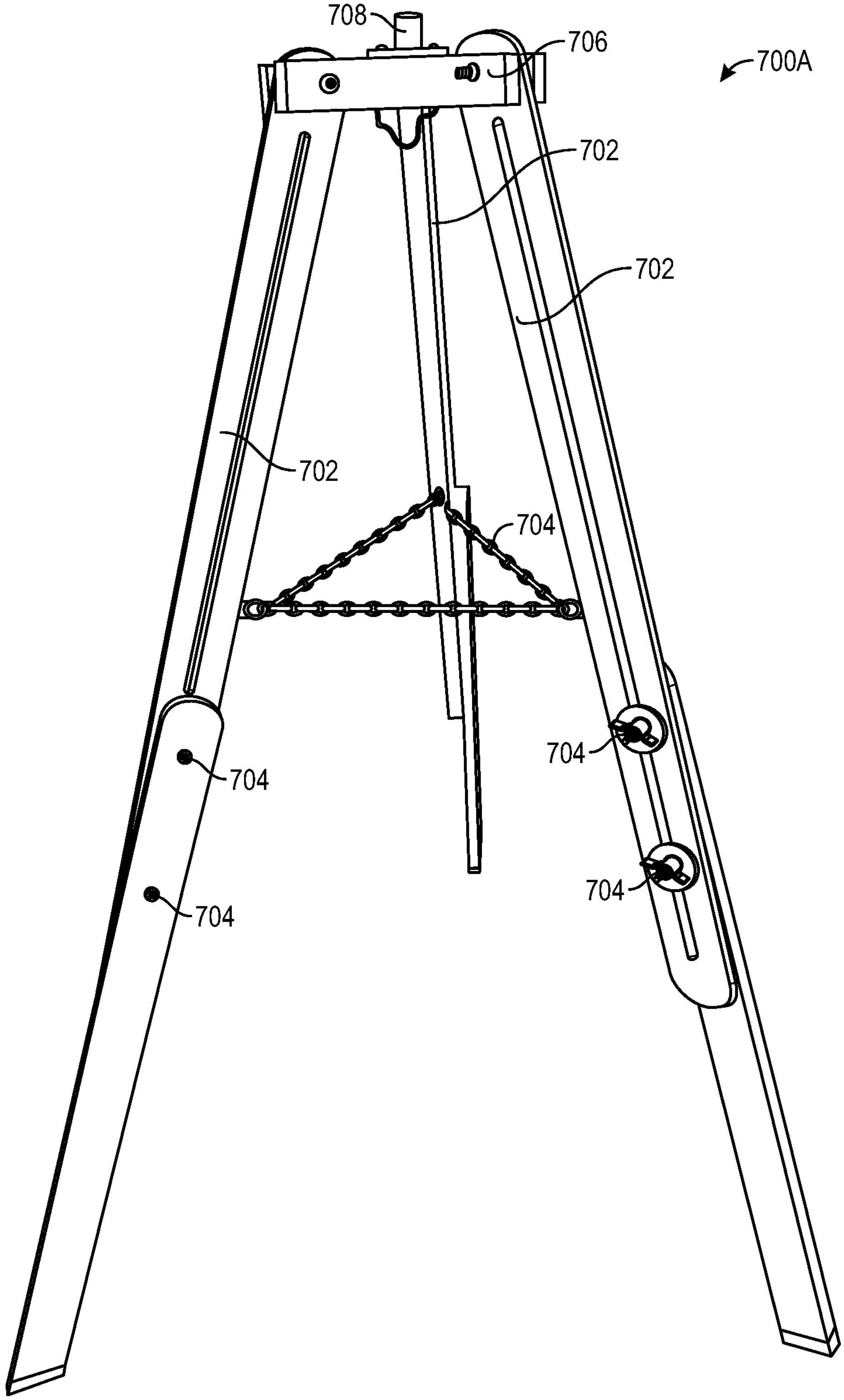
FIGS. 7A-7F illustrate examples of different types of stands with which a musical instrument support apparatus may be used.
Figure 7B:
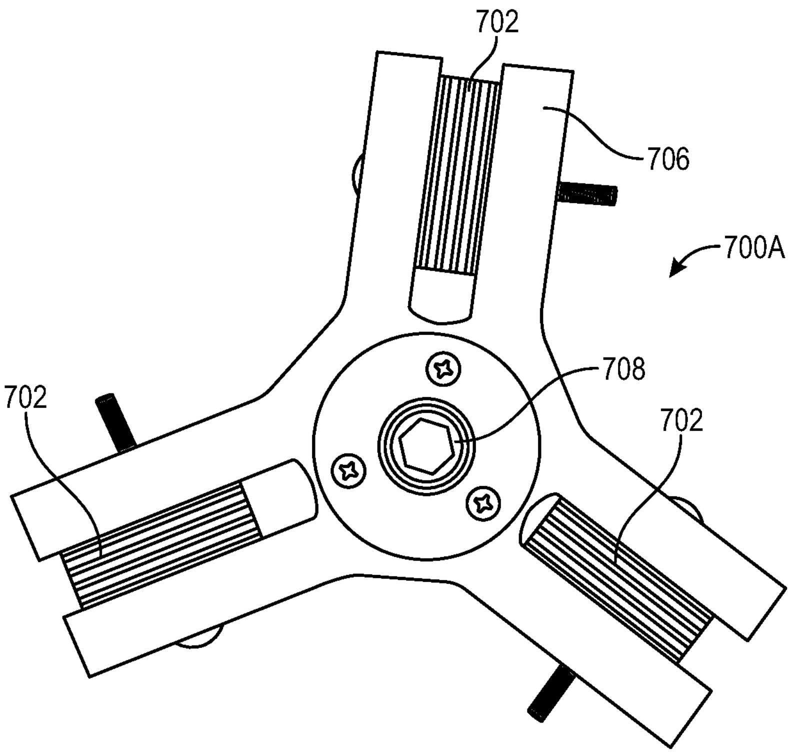

FIGS. 7A and 7B illustrate a side view and top view of an example of a tripod 700A. The tripod includes a base 706 onto which an adapter 708 and three legs 702 are coupled. The adapter 708 is configured to couple the tripod 700A with a musical instrument support apparatus in accordance with examples described herein. The legs 702 are rotatably coupled with the base 706 to enable the tripod to be collapsed into a more compact form for ease of transportation and storage. In the example illustrated in FIG. 7A, a chain 704 connects adjacent legs with one another to increase stability and enable a maximum open position of the tripod 700A; however, in other examples, a different mechanism (e.g., a flexible or folding element) may be included to make the tripod stable in an open position. In the illustrated example, the tripod 700A includes adjustment mechanisms 704 on each of the legs 702 to enable the height of the tripod 700A to be adjusted.

Figure 7C:
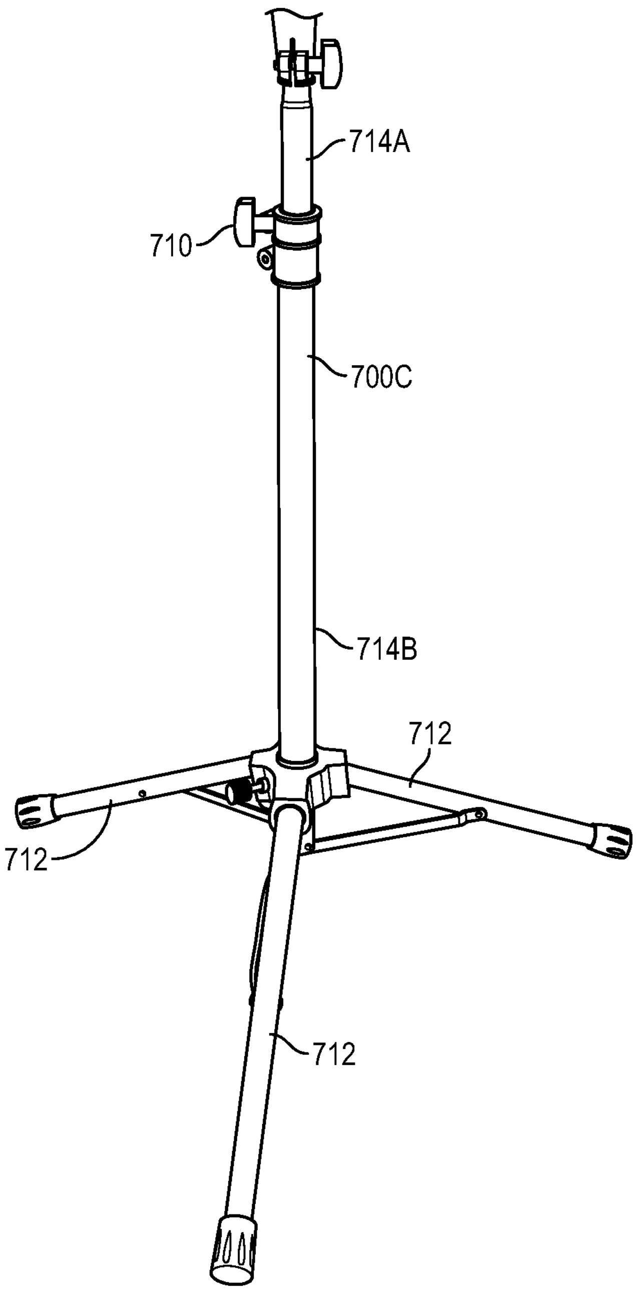

FIG. 7C illustrates an example of a music stand 700C. The music stand 700C includes one or more poles 714A and 714B coupled with legs 712 (e.g., three or more legs). The music stand 700C includes an adjustment mechanism 710 to enable the height of the stand 700C to be adjusted. In the illustrated example, the top of pole 714A is configured to couple with a musical instrument support apparatus in accordance with examples described herein.

Figure 7D:
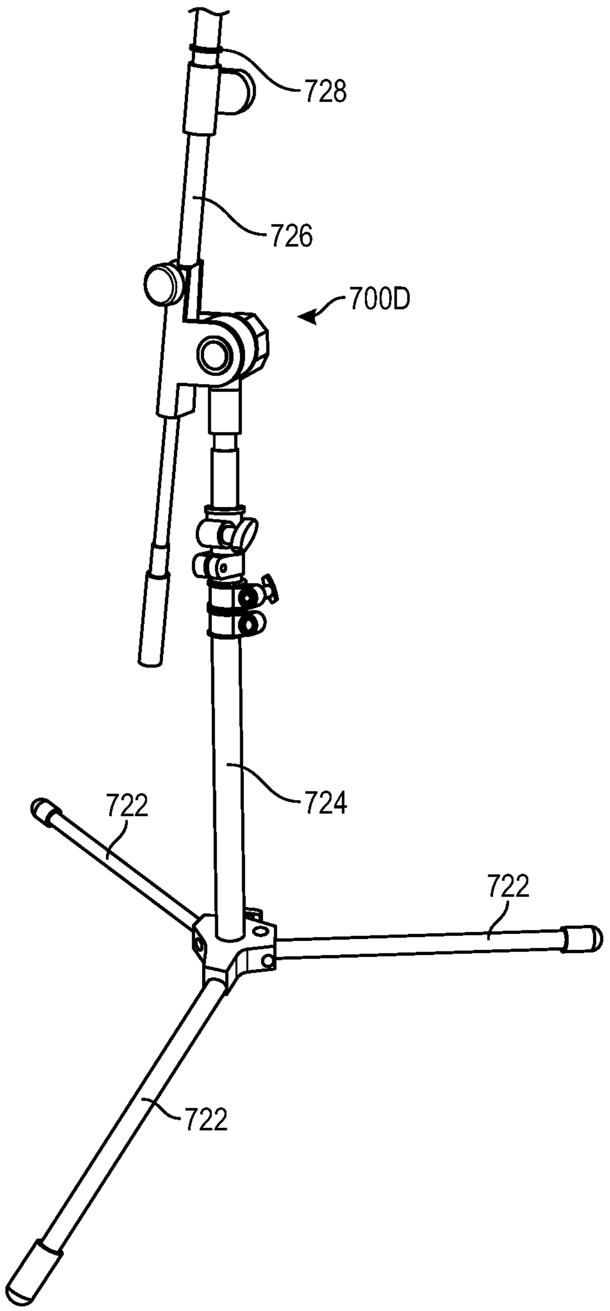

FIG. 7D illustrates an example of a microphone stand 700D. The microphone stand 700D includes one or more poles 724 coupled with legs 722 (e.g., three or more legs). A boom pole 726 is coupled with the one or more poles 724. The boom pole is coupled such that it can rotate or tilt with respect to the one or more poles 724. The boom includes an adapter 728 to couple with an adapter of the musical instrument support apparatus in accordance with examples described herein.

Figure 7E:
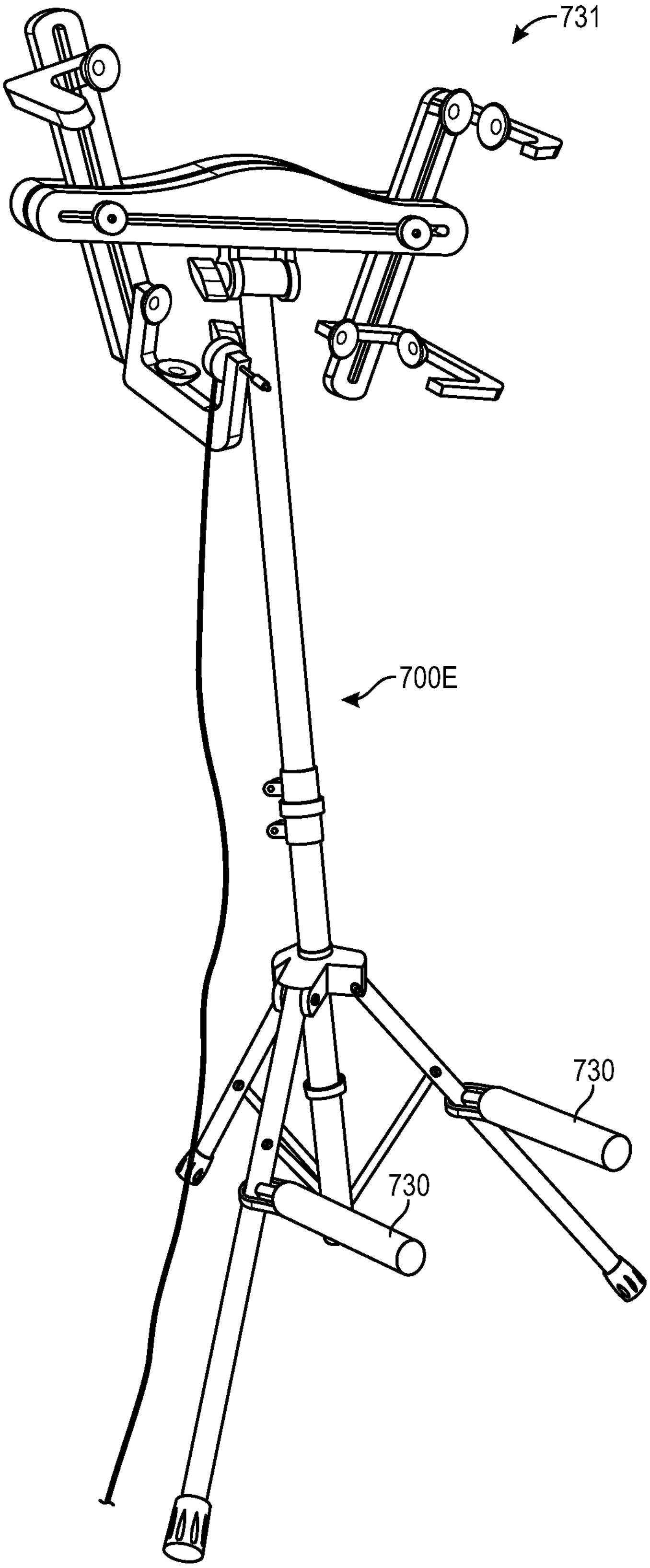
Figure 7F:
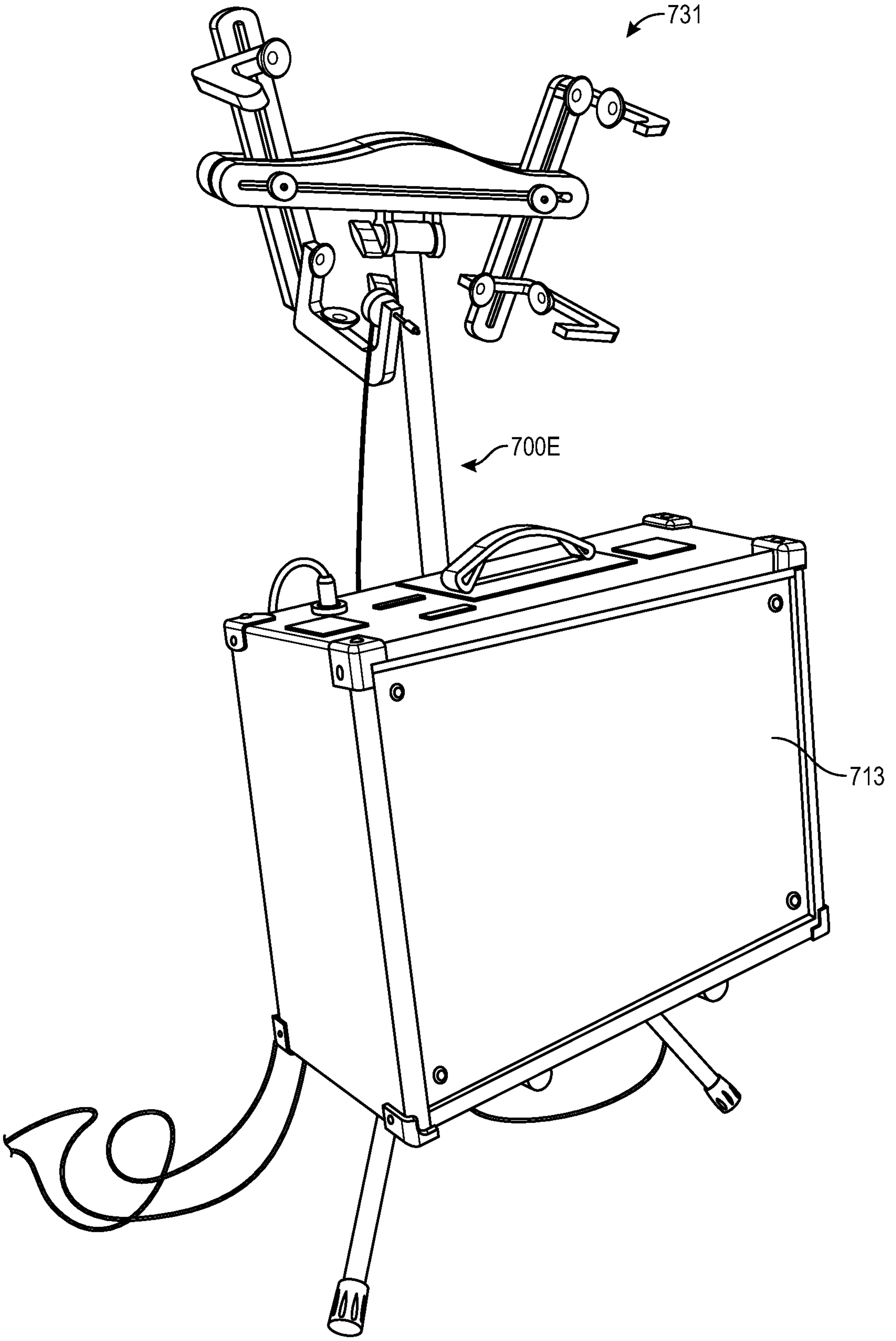

FIGS. 7E and 7F illustrate an example of a stand 700E with an amplifier (amp) holder. FIG. 7E illustrates the stand 700E without an amp. FIG. 7F illustrates the stand 700E with an amp 713. The amp holder illustrated in FIG. 7E includes two poles or support members 730 protruding from the stand 700E upon which an amplifier 713 can sit. In one example, the weight from the amplifier increases the stability of the stand 700E and thus the stability of the musical instrument support apparatus 731. A cable from a pickup coupled with the musical instrument support apparatus 731 can be routed to and connected to the amplifier 713.

The stands illustrated in FIGS. 7A-7E are nonlimiting examples of stands that can couple with and support a musical instrument support apparatus. Other stands may be used with a musical instrument support apparatus. In some examples, the musical instrument support apparatus includes a stand. In some examples, the musical instrument support apparatus can be removed from the stand for ease of transportation and storage.

Figure 8A:
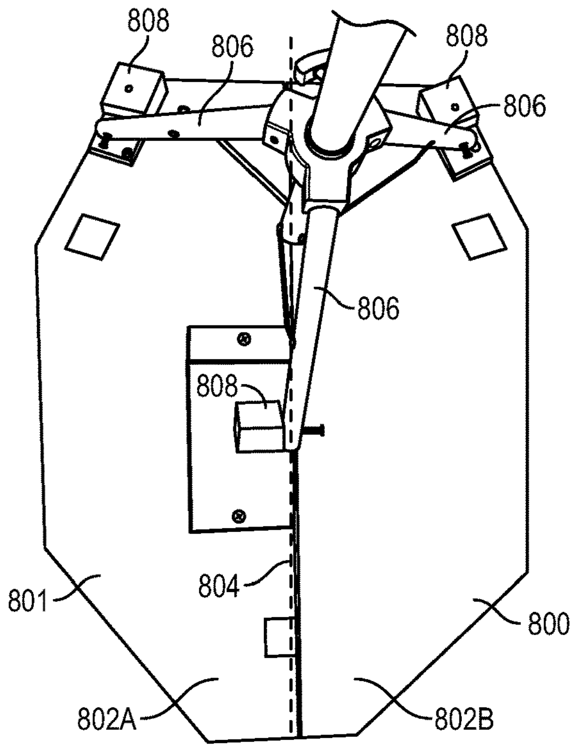
FIGS. 8A-8E illustrate an example of a board onto which a stand with a musical instrument support apparatus can be mounted.
Figure 8B:
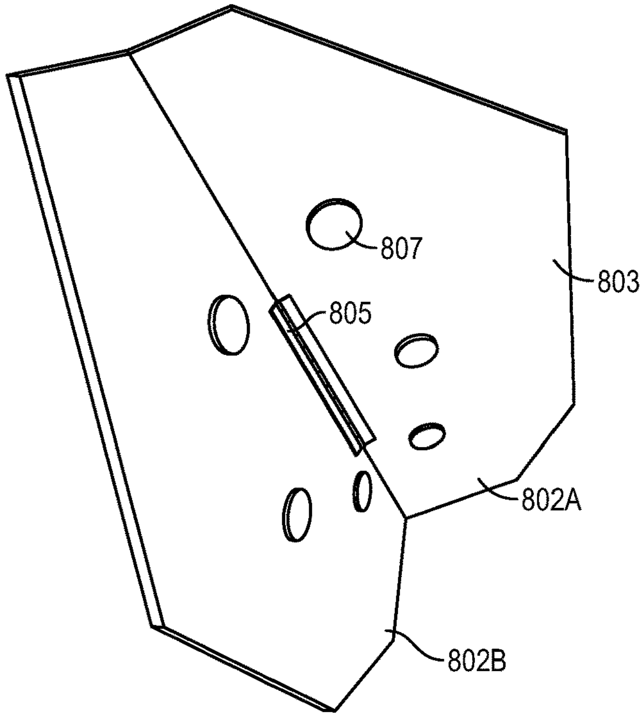
Figure 8C:
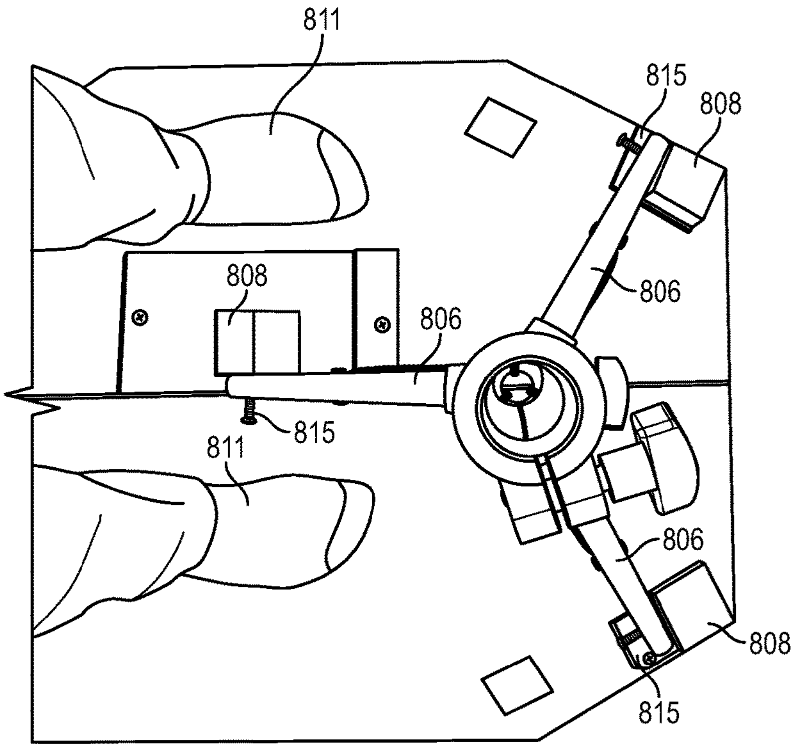
Figure 8D:
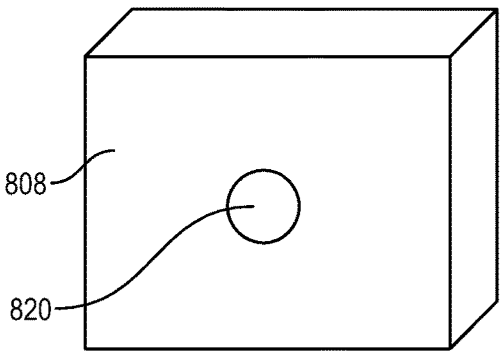
Figure 8E:
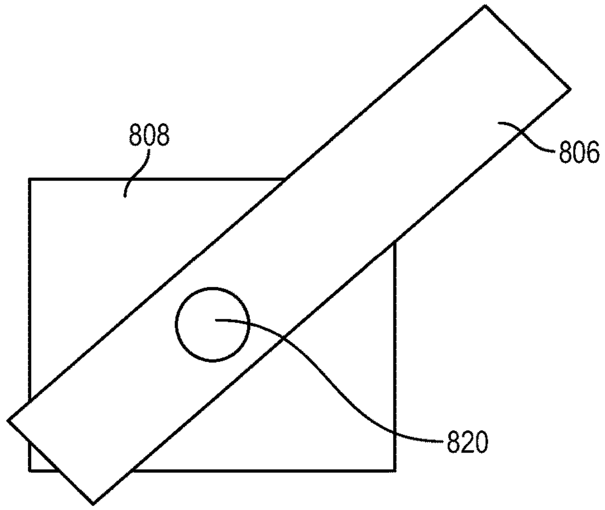

FIGS. 8A-8E illustrate an example of a board 800 onto which a stand with a musical instrument support apparatus can be mounted. FIGS. 8A and 8C illustrate top down views of the board 800. FIG. 8B illustrates a bottom view of the board 800. FIGS. 8D and 8E illustrate an example of a stand anchoring element of the board 800. In one example, the board 800 is configured to couple with the bottom of a stand (e.g., the legs of a stand). The musician can then stand on the board 800 while playing the instrument supported in a musical instrument support apparatus on the stand (e.g., a musician 811 standing on the board 800 is shown in FIG. 8C), adding stability to the entire assembly and preventing the stand and support apparatus from tipping over.

Referring first to FIGS. 8A-8C, the board 800 includes at least two portions 802A and 802B connected with one another with one or more hinges 805. However, in other examples, the board 800 may be formed from a single portion. In the example illustrated in FIGS. 8A-8C, the board 800 can be folded along the line 804 with a hinge 805 for ease of storage and transportation. Although not specifically shown, handles or cutouts can be included (e.g., on the sides of the board 800) to assist in carrying the board 800. In one example, the bottom side 803 of the board 800 includes pads 807, which can include a gripping material such as rubber to prevent the board from slipping on the floor or other supporting surface, and/or to prevent damage to the underlying floor. In one example, the board 800 includes multiple (e.g., three) stand anchoring elements 808 on a top side 801 of the board 800 to couple with legs 806 of a stand. In one example, each of the stand anchoring elements 808 includes a hole to receive a fastener 815 through a leg 806 of the stand adjacent to the stand anchoring element.

For example, FIGS. 8D and 8E illustrate an example of the stand anchoring elements 808. As can be seen in FIGS. 8D and 8E, the stand anchoring element 808 includes a hole 820 to receive a fastener (e.g., the fasteners 815 shown in FIG. 8C). When the stand is positioned so that the legs 806 of the stand are adjacent to the holes 820 of the anchoring elements 808, a fastener passed through a corresponding hole in the leg 806 and into the hole 820 secures the leg 806 to the board 800.

Thus, a musical instrument support apparatus is described herein. In accordance with examples, the apparatus is multi-faceted in that there are many different moving parts that work together to create a pair of supportive arms that can hold an instrument. Although some examples described herein refer to components of the musical instrument support apparatus being made of wood, other materials may be used (e.g., plastic, rubber, metal, or other materials). Although examples herein refer to two support arms, in other examples, a single support arm or more than two support arms may be included in the musical instrument support apparatus. Some elements of the musical instrument support apparatus are described as being rotatably or slidably attached, however, in other examples, such elements may be attached or included so that they are fixed in position and/or angle. Some examples refer to terms of orientation (e.g., top, bottom, front, back, vertical, and horizontal) for ease of understanding; however, the terms of orientation used herein are not intended to be limiting. Note that although some examples refer to using a musical instrument support apparatus while actively playing an instrument, in some examples, the musical instrument support apparatus can support the instrument at times when the musician is not playing the instrument. In general, the terms of orientation are intended to describe the musical instrument support apparatus and instrument as it may be oriented when a musician is playing the instrument in the support apparatus; however, different terms of orientation may apply depending on the instrument and circumstances. Also note that a musical instrument support apparatus may be formed (e.g., built or manufactured) in varying numbers of pieces, and sold in varying states of assembly. The terms coupled and attached are used interchangeably herein and may refer to elements that are removably attached (e.g., intended to be removable) or elements that are attached more permanently with one another (e.g., with glue or another attachment mechanism that is generally used to attach elements that are not intended to be removed). Coupling can be achieved with a variety of techniques, including the use of fasteners, adhesive, pressure, and/or with other coupling techniques.

Besides what is described herein, various modifications can be made to what is disclosed and implementations of the invention without departing from their scope. Therefore, the illustrations and examples herein should be construed in an illustrative, and not a restrictive sense.

The invention claimed is:

1. A musical instrument support assembly comprising:
- a base to couple with a stand;
- two support arms including a first support arm coupled with a first end of the base with a first fastener, and a second support arm coupled with a second end of the base with a second fastener, wherein:
  - the first support arm is rotatably attached to the base with the first fastener, the first support arm to rotate about the first fastener when the first fastener is loosened; and
  - the second support arm is rotatably attached to the base with the second fastener, the second support arm to rotate about the second fastener when the second fastener is loosened; and
- at least one support element coupled with each of the two support arms to support a musical instrument,
- wherein the at least one support element coupled with each of the two support arms includes an instrument securing element to contact and secure the musical instrument to the base.

2. The musical instrument support assembly of claim 1, comprising:
- two support elements coupled with at least one of the two support arms, the two support elements coupled with a support arm including:
  - a first support element coupled with a first end of the support arm with a third fastener, and
  - a second support element coupled with a second end of the support arm opposite the first end of the support arm with a fourth fastener;
- wherein the support arm is coupled with the base at a portion of the support arm between the first support element and the second support element.

3. The musical instrument support assembly of claim 2, further comprising:
- the two support elements coupled with each of the two support arms.

4. The musical instrument support assembly of claim 1, wherein:
- angles of the two support arms relative to the base are independently adjustable via rotation of the first support arm about the first fastener and rotation of the second support arm about the second fastener.

5. The musical instrument support assembly of claim 1, wherein:
- attachment points of the two support arms to the base are independently adjustable.

6. The musical instrument support assembly of claim 5, wherein:
- the base includes one or more slots;
- the first support arm is rotatably and slidably attached to the base with the first fastener through the one or more slots of the base, the first support arm to rotate about the first fastener and slide along a slot of the one or more slots when the first fastener is loosened; and
- the second support arm is rotatably and slidably attached to the base with the second fastener through the one or more slots of the base, the second support arm to rotate about the second fastener and slide along the slot when the second fastener is loosened.

7. The musical instrument support assembly of claim 1, wherein:
- each of the two support arms include one or more slots; and
- for each support arm, the at least one support element is rotatably and slidably attached with the support arm along the one or more slots in the support arm via a fastener through the one or more slots of the support arm.

8. The musical instrument support assembly of claim 7, wherein:
- an extent of protrusion of at least one of the two support arms from a top or bottom of the base is adjustable via loosening of the fastener through the one or more slots of the support arm.

9. The musical instrument support assembly of claim 1, wherein:
- the base includes:
  - a top,
  - a bottom,
  - two opposing side surfaces between the top and the bottom, and
  - one or more slots extending from the top of the base to the bottom of the base between the two opposing side surfaces of the base; and
  - the two support arms are coupled with the base through the one or more slots of the base between the two opposing side surfaces of the base.

10. The musical instrument support assembly of claim 1, wherein:
- the at least one support element rotatably coupled with each of the two support arms includes the instrument securing element to contact and secure the musical instrument.

11. The musical instrument support assembly of claim 10, wherein:
- the instrument securing element includes one or more suction cups attached to the at least one support element.

12. The musical instrument support assembly of claim 10, wherein:
- the instrument securing element of the support element of at least one of the two support arms includes a clamp.

13. The musical instrument support assembly of claim 12, wherein:

the support element with the clamp includes a recess to receive an electric pickup element.

14. The musical instrument support assembly of claim 1, wherein:

the at least one support element rotatably coupled with each of the two support arms includes: a first portion to support the musical instrument on one side of the musical instrument, and a second portion to wrap around a second side of the musical instrument.

15. The musical instrument support assembly of claim 1, further comprising:

the base includes a stand adapter to couple with the stand;

wherein the stand adapter includes a fastener to loosen to rotate the base about the fastener and tighten to secure the base in a position relative to the stand.

16. The musical instrument support assembly of claim 1, further comprising:

a board to couple with legs of the stand;

wherein the board includes three stand anchoring elements, each of the stand anchoring elements including a hole to receive a fastener through a leg of the stand adjacent to the stand anchoring element.

17. The musical instrument support assembly of claim 1, further including:

the stand.

18. The musical instrument support assembly of claim 1, wherein:

the musical instrument support assembly is at least partially assembled.

19. A set of parts configured to be assembled into a musical instrument support apparatus, the set of parts comprising:

a base including a first end and a second end opposite to the first end, and a stand adapter at a bottom of the base between the first end and the second end to couple with a stand to elevate the musical instrument support apparatus from a supporting surface on which the stand rests;

a first support arm to attach to the first end of the base with a first fastener;

a second support arm to attach to the second end of the base with a second fastener;

a first support element to attach to the first support arm with a third fastener to support a musical instrument; and a second support element to attach to the second support arm with a fourth fastener to support the musical instrument, wherein the first and second support elements each include an instrument securing element to contact and secure the musical instrument to the base.

20. The set of parts of claim 19, wherein:

two or more of the parts are pre-assembled.

21. A musical instrument support apparatus comprising:

a base to couple with a stand wherein:

the base includes a stand adapter to couple with the stand, and the stand adapter includes a fastener to loosen to rotate the base about the fastener and tighten to secure the base in a position relative to the stand;

two support arms, including a first support arm rotatably coupled with a first end of the base with a first fastener, and a second support arm rotatably coupled with a second end of the base with a second fastener; and two support elements coupled with each of the two support arms to support a musical instrument, wherein the at least one of the two support elements coupled with each of the two support arms includes one or more suction cups to contact and secure the musical instrument to the base.

22. The musical instrument support apparatus of claim 21, wherein:

the musical instrument support apparatus is at least partially assembled.

23. The musical instrument support apparatus of claim 21, further comprising:

the stand.

* * * * *